(12) United States Patent
Huang

(10) Patent No.: US 7,900,197 B2
(45) Date of Patent: Mar. 1, 2011

(54) PROGRAM INITIATION METHODS AND EMBEDDED SYSTEMS UTILIZING THE SAME

(75) Inventor: Jiun-Jeng Huang, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 1322 days.

(21) Appl. No.: 11/436,445

(22) Filed: May 18, 2006

(65) Prior Publication Data

US 2007/0028224 A1    Feb. 1, 2007

(30) Foreign Application Priority Data

Jul. 28, 2005 (TW) .............................. 94125612 A

(51) Int. Cl.
*G06F 9/45* (2006.01)
*G06F 13/38* (2006.01)
*G06F 13/00* (2006.01)

(52) U.S. Cl. .................. 717/152; 710/68; 711/151; 711/158

(58) Field of Classification Search .................. 717/151
See application file for complete search history.

(56) References Cited

U.S. PATENT DOCUMENTS

| | | | | |
|---|---|---|---|---|
| 5,212,633 A | * | 5/1993 | Franzmeier | ................... 703/23 |
| 5,559,978 A | * | 9/1996 | Spilo | ........................... 711/203 |
| 5,940,871 A | * | 8/1999 | Goyal et al. | ................. 711/206 |
| 6,195,107 B1 | * | 2/2001 | Iverson | ........................ 711/203 |
| 6,298,422 B1 | * | 10/2001 | Spilo et al. | ................... 711/154 |
| 6,496,882 B2 | * | 12/2002 | Iverson | ......................... 710/68 |
| 6,658,549 B2 | * | 12/2003 | Wilson et al. | ............... 711/202 |
| 6,694,393 B1 | * | 2/2004 | Sutter, Jr. | ...................... 710/68 |
| 7,774,768 B2 | * | 8/2010 | Warnes | ........................ 717/151 |
| 2002/0073298 A1 | * | 6/2002 | Geiger et al. | ............... 711/206 |
| 2004/0148345 A1 | * | 7/2004 | Yoshii et al. | ................. 709/203 |
| 2007/0028224 A1 | * | 2/2007 | Huang | ......................... 717/162 |

\* cited by examiner

*Primary Examiner*—Tuan Q Dam
*Assistant Examiner*—Marina Lee

(57) ABSTRACT

An embedded system comprises a storage device, a main memory, and an operating system (OS). The storage device stores executable files, data files, and at least one dependency tag of an application which have been installed on the embedded system. The dependency tag records relationships between the application and related data files utilized by the application under various execution statuses. The OS comprises a module which, when requested to execute the application, locates the related data files of the application according to the dependency tag, loads the executable file and the related data files to the main memory, and execute the executable file.

8 Claims, 5 Drawing Sheets

PROGRAM INITIATION METHODS AND EMBEDDED SYSTEMS UTILIZING THE SAME

BACKGROUND

The invention relates to embedded system techniques, and in particular, to program initiation methods.

Computability and main memory capacity in embedded systems are very restricted, thus system resources thereof must be well managed. Prior to executing an application, a typical embedded system decompresses and loads an image file of the application from storage media to a main memory. Due to high memory cost, data compression methods are provided to enhance main memory usage efficiency. These methods are roughly classified as dynamical and static decompression techniques.

Static decompression techniques are implemented by modifying a boot procedure to decompress and load an operating system (OS), applications, and required function libraries into a main memory during a computer boot process. This improves application execution efficiency and reduces required storage medium capacity, but, consumption of main memory capacity is increased.

For example, if a decompressed file system of an embedded system is 32 MB (megabytes), an embedded system with a compression ratio 10%~25% may require 3.2 MB~8 MB of mass storage capacity. Application execution also utilizes main memory space, thus, the embedded system requires approximately 64 MB or more of main memory capacity.

Dynamic decompression techniques are implemented by modifying a file system to decompress and load only a section of program codes for application execution. While an application runs, data files in libraries are subsequently decompressed and loaded as needed. Thus, dynamic decompression consumes processor resources and slows application execution by up to 30%.

In a 32 MB file system, an embedded system utilizing the dynamic decompression techniques only requires 16 MB of mass storage capacity and 2 MB~32 MB of main memory capacity. Application execution, however, is very slow.

U.S. Pat. No. 6,298,422 discloses a method capable of reducing central processing unit (CPU) workloads and main memory capacity usage utilizing a multitasking OS. Typical embedded systems, however, are uni-tasking and do not utilize virtual memory, thus incompatible with this method.

SUMMARY

Accordingly, program initiation methods and embedded systems utilizing the same are provided.

An exemplary embodiment of an embedded system comprises a storage device, a main memory, and an operating system (OS). The storage device stores an executable file, data files, and at least one dependency tag of an application installed on the embedded system. The dependency tag records a relationship between the application and a related data file which is required by the application executed. The OS coupled to the storage device and the main memory comprises a module. When requested to execute the application, the module locates the related data file from the data files according to the dependency tag, loads the executable file and the related data file to the main memory, and executes the executable file.

An exemplary embodiment of a program initiation method is implemented in an embedded system comprising a main memory, and a storage device. The storage device stores an application and at least one dependency tag. The application comprises an executable file and data files and requires at least one related data file when executed. The dependency tag records a relationship between the application and related data file. When requested to execute the application, the related data file is located from the data files according to the dependency tag. The executable file and the related data file are loaded to the main memory, and the executable file is executed.

DESCRIPTION OF THE DRAWINGS

The invention can be more fully understood by reading the subsequent detailed description and examples with references made to the accompanying drawings, wherein.

DETAILED DESCRIPTION

Program initiation methods and embedded systems utilizing the same are provided. Note that entities, steps, and configuration thereof described in the following are only examples and can be adjusted according to real requirements.

Figure 1:
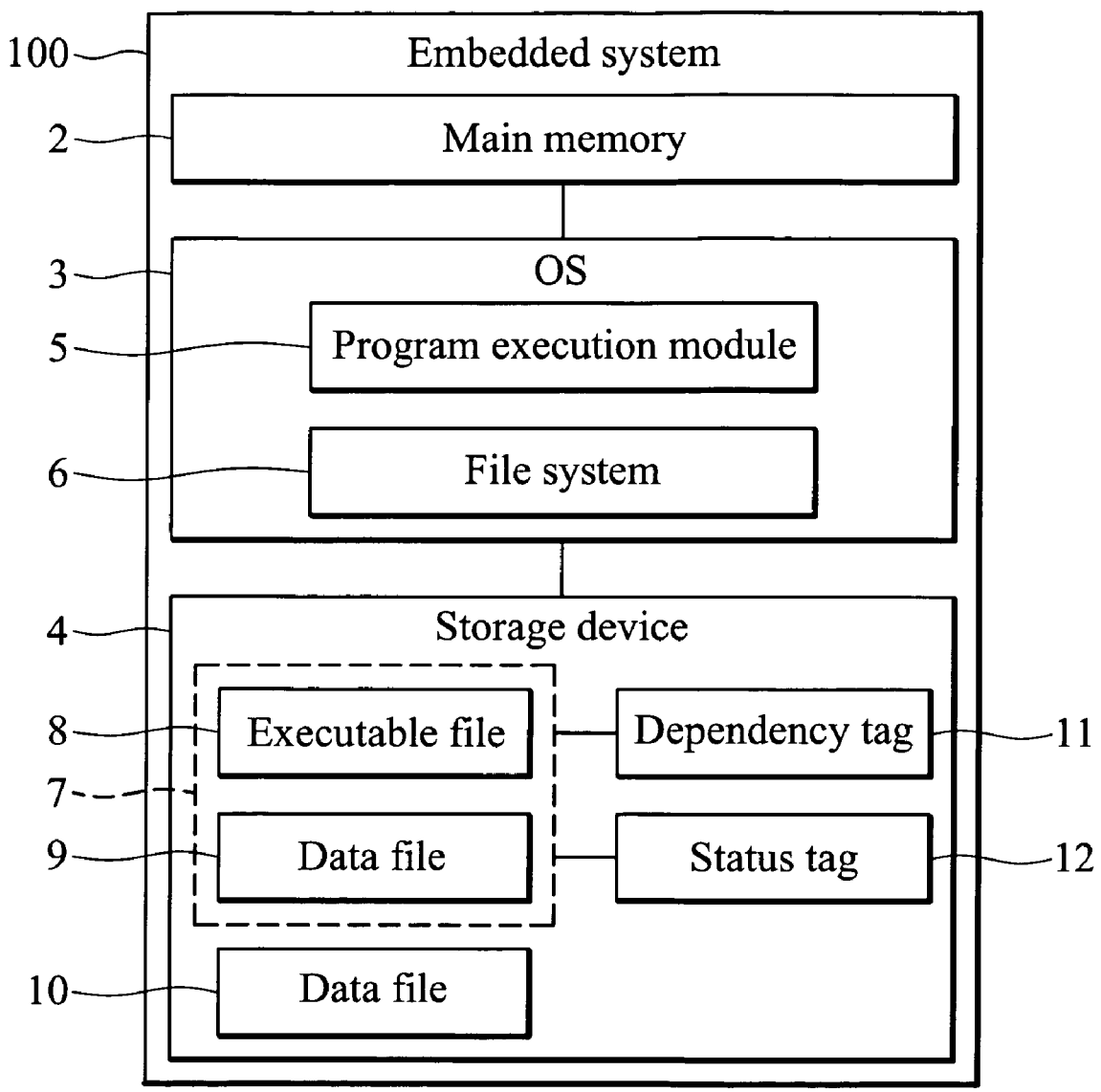
FIG. 1 is a block diagram of the configuration of an exemplary embodiment of an embedded system.

With reference to FIG. 1, embedded system 100 comprises main memory 2, operating system (OS) 3, and storage device 4. OS 3 may be implemented by computer programs executable by a processor (not shown) of embedded system 100. Storage device 4 may comprise a hard drive, a tape, a disk, a flash memory card, or other storage media.

Storage device 4 stores dependency tags, status tags, and applications which have been installed on embedded system 100. Each application comprises an executable file, corresponding dependency tags and status tags. Data stored in storage device 4 has been compressed. The dependency tags record relationships between the applications and related data files which are to be utilized by the applications in their various execution states. Each status tag indicates the current status of a corresponding application.

For example, application 7 comprising executable file 8 and data file 9 corresponds to dependency tag 11 and status tag 12. Storage device 4 additionally comprises data file 10 provided by OS 3.

OS 3 coupled to storage device 4 and main memory 2 comprises program execution module 5 and file system 6.

Figure 2:
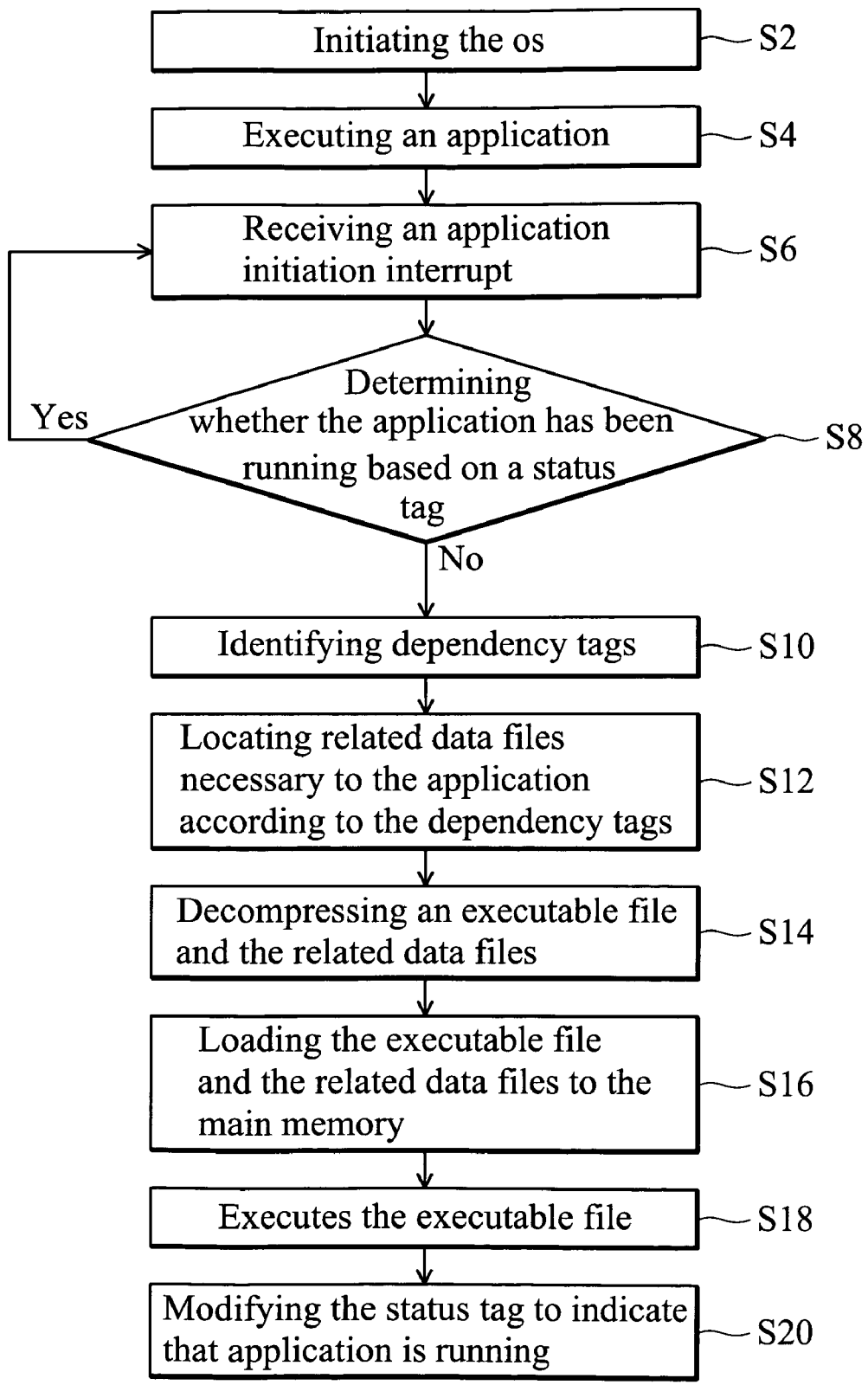
FIG. 2 is a flowchart of an exemplary embodiment of a program initiation method.

An exemplary embodiment of a program initiation method is described with reference to FIG. 2.

After completing the boot process, embedded system 100 loads and initiates OS 3 (step S2). Embedded system 100 generates an application initiation interrupt for executing application 7 (step S4). Program execution module 5 receives the application initiation interrupt (step S6), and automatically performs the steps described in the following:

When requested to execute application 7, program execution module 5 determines whether the application has been running based on status tag 12 (step S8). If so, program execution module 5 is idle until another application initiation interrupt (step S6) is received. If not, program execution module 5 identifies dependency tag 11 (step S10), retrieves executable file 8, and locates related data files required by application 7 according to dependency tag 11 (step S12). For example, data files 9 and 10 are required by application 7. Data files 9 and 10 may comprise graphic files, configuration files, functions, or other data necessary to the application.

Program execution module 5 retrieves executable file 8 and related data files 9 and 10 utilizing file system 6. Next, program execution module 5 decompresses executable file 8 and related data files 9 and 10 (step S14). Note that the decompression may be performed by a file system.

Program execution module 5 loads executable file 8 and related data files 9 and 10 to main memory 2 (step S16), and executes executable file 8 (step S18). After initiating executable file 8, program execution module 5 accordingly modifies status tag 12 to indicate that application 7 is running (step S20). In step S16, dependency tag 11 and status tag 12 can be also loaded to main memory 2.

Figure 3:
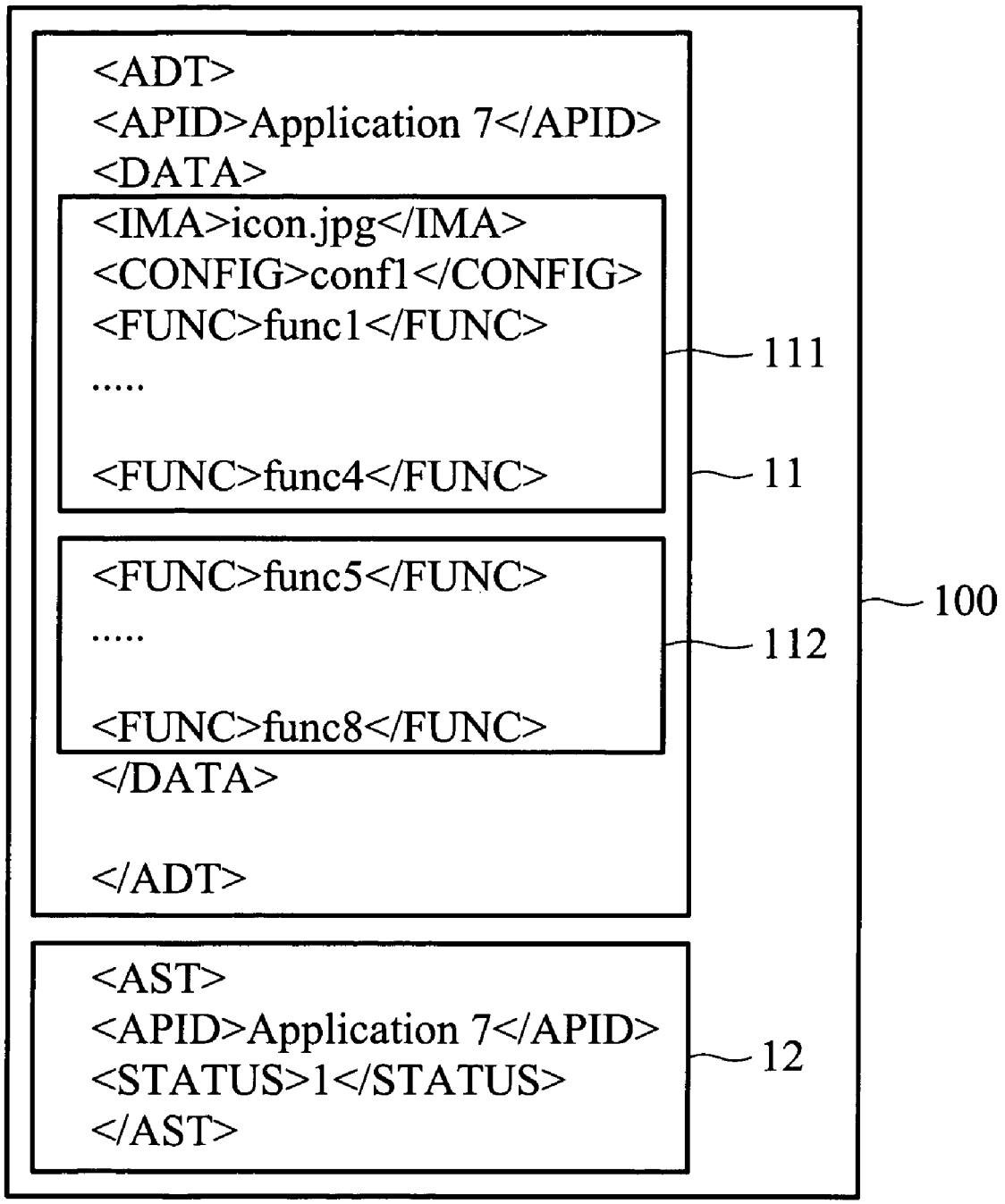
FIG. 3 is a schematic diagram of examples of dependency tags and status tags.

FIG. 3 shows examples of dependency tag 11 and status tag 12. The content of dependency tag 11 is delimited between <ADT> and </ADT>. Identification of application 7 is delimited between <APID> and </APID>. Information indicating that a data file necessary for application 7 is delimited between <DATA> and </DATA>, wherein block 111 indicates data file 9, and block 112 indicates data file 10. The content of status tag 12 is delimited between <AST> and </AST>. Identification of application 7 is delimited between <APID> and </APID>. Information indicating the status of application 7 is delimited between <STATUS> and </STATUS>. For example, "1" states that application 7 is running, and "0" states that application 7 is terminated. In step S20, program execution module 5 writes the value "1" between <STATUS> and </STATUS>.

Similarly, program execution module 5 may execute other applications in a manner similar to that of the described steps.

Figure 4:
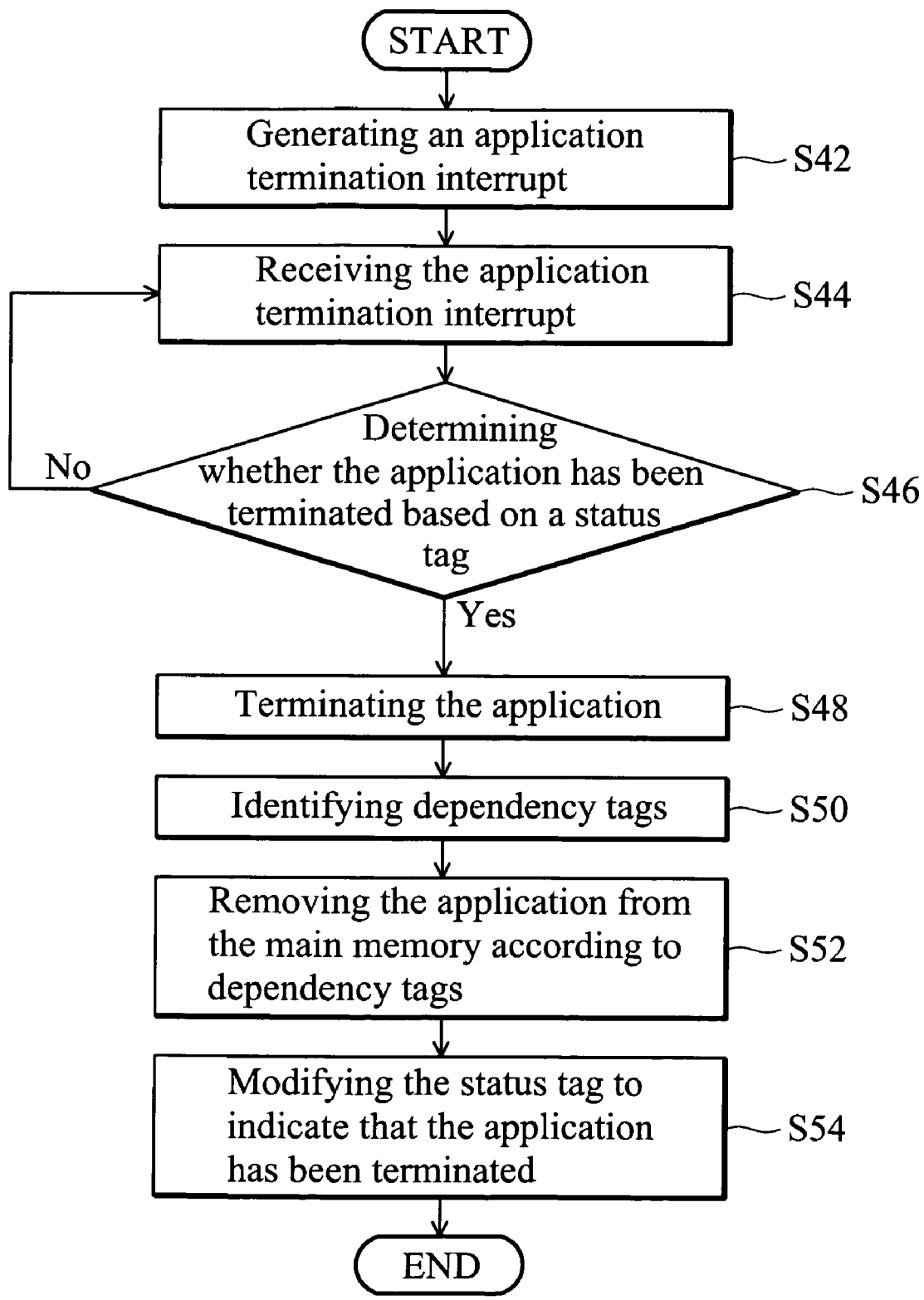
FIG. 4 is a flowchart of terminating programs.

The application termination procedure is described with reference to FIG. 4.

Embedded system 100 generates an application termination interrupt to stop application 7 (step S42). Program execution module 5 receives the application termination interrupt (step S44). Upon receiving the application termination interrupt, and being requested to terminate application 7, program execution module 5 automatically performs the steps described in the following.

Program execution module 5 determines whether the application has been terminated based on status tag 12 (step S46). If so, program execution module 5 is idle until receiving another application termination interrupt (step S44). If not, program execution module 5 terminates application 7 (step S48), identifies dependency tag 11 (step S50), and removes executable file 8, related data files utilized by application 7 from main memory 2 according to dependency tag 11 (step S52). For example, if data files 9 and 10 have been utilized by application 7, program execution module 5 removes data files 9 and 10 and executable file 8 from main memory 2.

After terminating application 7, program execution module 5 accordingly modifies status tag 12 to indicate that application 7 has been terminated (step S54). Status tag 12 may remain in main memory 12 or be stored in storage device 4.

Figure 5:
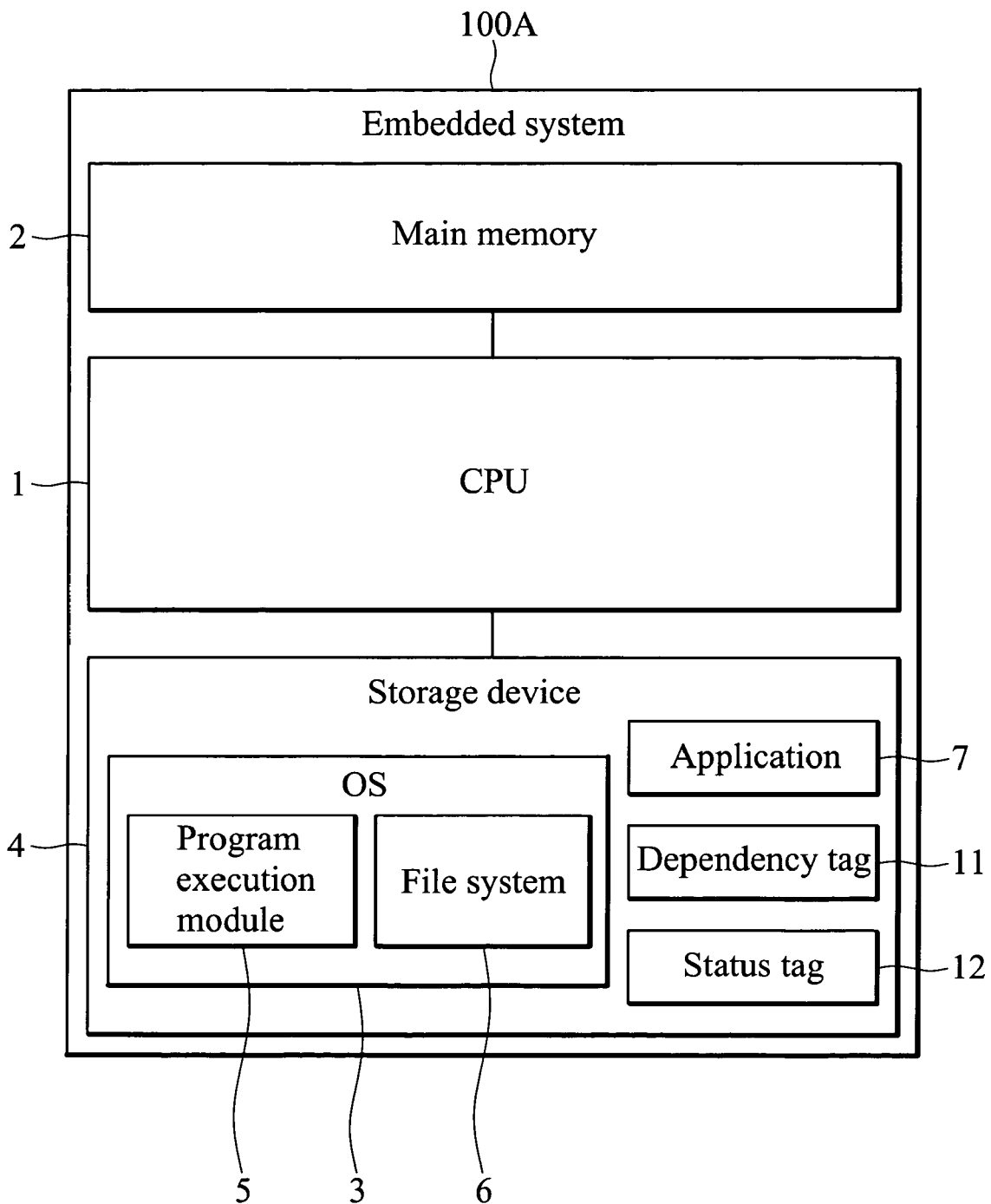
FIG. 5 is a block diagram of a storage medium implementing the program initiation method.

With reference to FIG. 5, embedded system 100A comprises processor 1, main memory 2, operating system (OS) 3, and storage device 4. OS 3 is stored in storage device 4 which, when loaded into embedded system 100A, directs processor 1 to perform the described steps.

Thus, the embedded system comprises dependency tags of installed applications, forming the basis of determining which data files to load to a main memory at application initiation. The dependency tags also form the basis of determining which data is cleared when an application is terminated. This method does not modify a file system, thus data to be loaded at application initiation may be adjusted based on application.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An embedded system, comprising:
a storage device storing an executable file, data files, and at least one dependency tag of an application which have been installed on the embedded system, wherein the dependency tag records a relationship between the application and a related data file which is required by the executed application;
a main memory, comprising a status tag of the application; and
an operating system (OS) coupled to the storage device and the main memory, comprising a module, wherein, when requested to execute the application, the module locates the related data file from the data files according to the dependency tag, loads the executable file and the related data file to the main memory, and executes the executable file;
wherein the executable file and the related data file in the storage device have been compressed and are then decompressed by the module before execution of the executable file;
wherein when requested to execute the application, the module determines whether the application has been running based on the status tag;
wherein after executing the application, the module accordingly modifies the status tag to indicate that the application has been running;
wherein when requested to terminate the application, the module removes the executable file and the related data file from the main memory and accordingly modifies the status tag to indicate that the application has been terminated.

2. The embedded system as claimed in claim 1, wherein the module comprises a program execution module retrieving the executable file and the related data file utilizing a file system.

3. The embedded system as claimed in claim 1, wherein, before removing the executable and the related file from the main memory, the module determines whether the application has been terminated based on the status tag.

4. The embedded system as claimed in claim 1, wherein, when requested to terminate the application, the module removes the related file from the main memory based on the dependency tag.

5. A program initiation method, implemented in an embedded system comprising a main memory and a storage device, comprising:
storing an application and at least one dependency tag in the storage device, wherein the application comprises an executable file which has been compressed and data files, the application requires at least one related data file which has been compressed when executed, the dependency tag records a relationship between the application and related data file;

decompressing the executable file and the related data file utilizing a module of an operating system (OS) of the embedded system before execution of the executable file;

when requested to execute the application, locating the related data file from the data files according to the dependency tag, and the module determines whether the application has been running based on a status tag of the application;

loading the executable file and the related data file to the main memory; and executing the executable file;

after executing the application, the module accordingly modifying the status tag to indicate that the application has been running; and when requested to terminate the application, the module removing the executable and the related data file from the main memory and accordingly modifies the status tag to indicate that the application has been terminated.

6. The method as claimed in claim 5, wherein the module comprises a program execution module retrieving the executable file and the related data file utilizing a file system.

7. The method as claimed in claim 5, wherein, before removing the executable and the related file from the main memory, the module determines whether the application has been terminated based on the status tag.

8. The method as claimed in claim 7, wherein, when requested to terminate the application, the module removes the related file from the main memory according to the dependency tag.

* * * * *